(12) United States Patent
Xia et al.

(10) Patent No.: US 12,004,270 B2
(45) Date of Patent: Jun. 4, 2024

(54) CONTROL CIRCUIT FOR ELECTRIC BLANKET

(71) Applicant: Zhejiang Shuoqi Home Textile Products Co., Ltd., Zhejiang Province (CN)

(72) Inventors: Yibing Xia, Zhejiang Province (CN); Mingwen Qi, Zhejiang Province (CN); Tianming Luo, Zhejiang Province (CN)

(73) Assignee: Zhejiang Shuogi Home Textile Products Co., Ltd., Zhejiang Province (CN)

( * ) Notice: Subject to any disclaimer, the term of this patent is extended or adjusted under 35 U.S.C. 154(b) by 810 days.

(21) Appl. No.: 17/151,473

(22) Filed: Jan. 18, 2021

(65) Prior Publication Data
US 2021/0227635 A1  Jul. 22, 2021

(30) Foreign Application Priority Data

Jan. 19, 2020 (CN) .......................... 202010059341.1

(51) Int. Cl.
*H05B 1/02* (2006.01)
*H05B 3/34* (2006.01)
*H02M 1/32* (2007.01)

(52) U.S. Cl.
CPC ........... *H05B 1/0272* (2013.01); *H05B 3/342* (2013.01); *H02M 1/32* (2013.01)

(58) Field of Classification Search
CPC .... H05B 1/0272; H05B 1/00294; H05B 1/02; H05B 3/342; H05B 3/36; H02M 1/32; H02M 1/0006; H02M 7/217; H05M 5/2573
See application file for complete search history.

(56) References Cited

U.S. PATENT DOCUMENTS

2023/0036804 A1\* 2/2023 Zhou ........................ H05B 3/36
2023/0056786 A1\* 2/2023 Zhou .................... H05B 1/0272

FOREIGN PATENT DOCUMENTS

CN           113141690 A   *   7/2021

\* cited by examiner

*Primary Examiner* — Shawntina T Fuqua
(74) *Attorney, Agent, or Firm* — HEA Law PLLC; Darrin A. Auito

(57) ABSTRACT

The present disclosure relates to a control circuit for an electric blanket. The control circuit includes a main control circuit composed of a relatively low voltage power conversion circuit, a heating main loop, a micro control unit (MCU) main control circuit, an active/passive protection circuit and a main power carrier serial port circuit. The control circuit further includes a sub-control circuit. The sub-control circuit is composed of an auxiliary power carrier serial port circuit, a sub-control power extraction circuit, an MCU sub-control circuit, a function key input circuit and a display circuit. The main control circuit and the sub-control circuit exchange operating state information and user control information through the main power carrier serial port circuit and the auxiliary power carrier serial port circuit to implement heating control of the electric blanket in a mutually cooperative control mode.

17 Claims, 16 Drawing Sheets

CONTROL CIRCUIT FOR ELECTRIC BLANKET

CROSS-REFERENCE TO RELATED APPLICATIONS

The present application claims priority to the Chinese Patent Application No. 202010059341.1, filed with China National Intellectual Property Administration (CNIPA) on Jan. 19, 2020, and entitled "CONTROL CIRCUIT FOR ELECTRIC BLANKET", which is incorporated herein by reference in its entirety.

TECHNICAL FIELD

The present disclosure relates to the technical field of temperature control of an electric heating body, and in particular, to a control circuit for an electric blanket.

BACKGROUND

At present, conventional electric heating products at home and abroad, such as heating pads and electric blankets, are each connected with a controller through a line, and the controller is connected to a line and connected to a power plug through the line. Because of the design of its internal control circuit, the controller is bulky. When in use, the electric blanket must be connected to the controller, which is cumbersome and inconvenient, and also affects the attractiveness of a whole blanket body and reduces people's use experience.

SUMMARY

In view of this, the objective of the present disclosure is to provide a control circuit for an electric blanket, which controls the heating of an electric blanket body in an interactive control mode, so that the control circuit is more convenient to use.

To implement the foregoing objective, the present disclosure provides the following solutions:

A control circuit for an electric blanket includes a main control circuit composed of a relatively low voltage power conversion circuit A1, a heating main loop A2, a micro control unit (MCU) main control circuit A3, an active/passive protection circuit A4 and a main power carrier serial port circuit A5, where the control circuit further includes a sub-control circuit; the sub-control circuit is composed of an auxiliary power carrier serial port circuit B1, a sub-control power extraction circuit B2, an MCU sub-control circuit B3, a function key input circuit B4 and a display circuit B5; and the main control circuit and the sub-control circuit exchange state information and control information through the main power carrier serial port circuit A5 and the auxiliary power carrier serial port circuit B1 to implement heating control of the electric blanket in a mutually cooperative control mode.

According to specific embodiments of the present disclosure, the present disclosure has the following technical effects.

The control circuit for an electric blanket according to the present disclosure is composed of a main control circuit and a sub-control circuit, where the main control circuit includes a relatively low voltage power conversion circuit, a heating main loop, an MCU main control circuit, an active/passive protection circuit and a main power carrier serial port circuit; and the sub-control circuit includes an auxiliary power carrier serial port circuit, a sub-control power extraction circuit, an MCU sub-control circuit, a function key input circuit and a display circuit. The main control circuit and the sub-control circuit according to the present disclosure control heating of electric heating products in a mutually cooperative control mode, reduce the weight of the control circuit for an electric blanket and make the control circuit more convenient to use.

BRIEF DESCRIPTION OF THE DRAWINGS

In order to illustrate the embodiments of the present disclosure or the technical solutions of the prior art, the accompanying drawing to be used in the embodiments will be described briefly below. Obviously, the accompanying drawings in the following description merely illustrate some embodiments of the present disclosure, and other accompanying drawings may also be obtained according to these accompanying drawings without creative effects.

DETAILED DESCRIPTION

Figure 1:
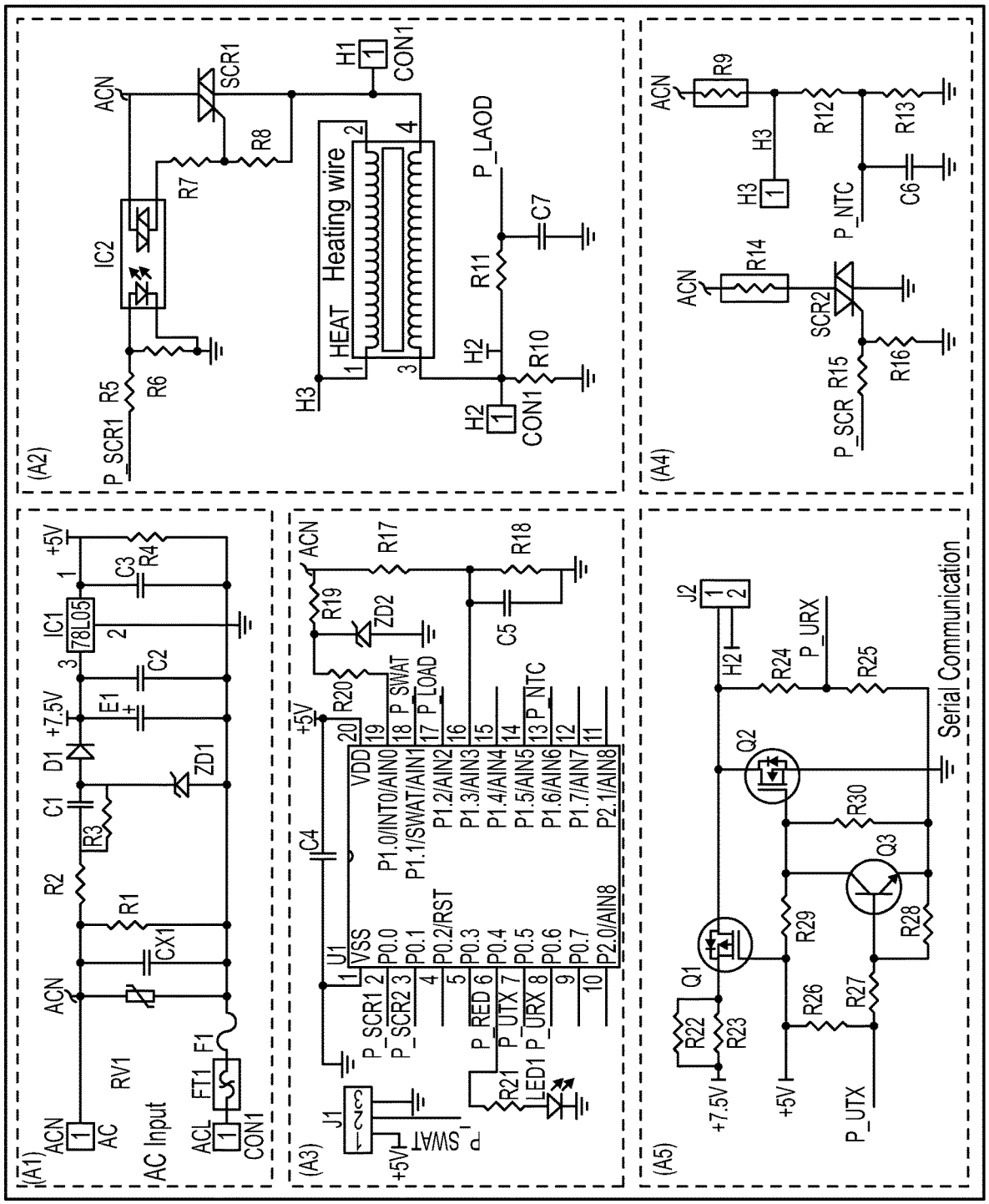
FIG. 1 is a schematic diagram of a first main control circuit according to an embodiment of the present disclosure.

The following clearly and completely describes the technical solutions in the embodiments of the present disclosure with reference to accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The objective of the present disclosure is to provide a control circuit for an electric blanket, which controls the heating of an electric blanket body in an interactive control mode, so that the control circuit is more convenient to use.

To make the foregoing objective, features, and advantages of the present disclosure clearer and more comprehensible, the present disclosure is further described in detail below with reference to the accompanying drawings and specific embodiments.

FIGS. 1 to 11 are circuit diagrams of the present disclosure.

The present disclosure provides a control circuit for an electric blanket, which control an electric heating product to operate normally by adopting a control mode of interaction between a main control and a sub-control. The control circuit includes a main control circuit and a sub-control circuit, namely the main control and the sub-control. The main control circuit and the sub-control circuit are each provided with an MCU. For convenience of explanation, the MCU in the main control circuit is hereinafter referred to as a main MCU, and the MCU in the sub-control circuit is hereinafter referred to as an auxiliary MCU. The main control circuit is composed of a relatively low voltage power conversion circuit A1, a heating main loop A2, an MCU main control circuit A3, an active/passive protection circuit A4 and a main power carrier serial port circuit A5. The sub-control circuit is composed of an auxiliary power carrier serial port circuit B1, a sub-control power extraction circuit B2, an MCU sub-control circuit B3, a function key input circuit B4 and a display circuit B5. The main control circuit and the sub-control circuit exchange operating state information and user control information through the main power carrier serial port circuit A5 and the auxiliary power carrier serial port circuit B1 to control the heating of the electric blanket in a mutually cooperative control mode.

The relatively low voltage power conversion circuit A1 changes the alternating current into a +5 V voltage, and the +5 V voltage provides power for the heating main loop A2, the active/passive protection circuit A4, the main power carrier serial port circuit A5 and the MCU main control circuit A3.

The sub-control power extraction circuit B2 acquires a +3 V voltage or +5 V voltage from the main control circuit through the auxiliary power carrier serial port circuit B1; and the +3 V voltage or +5 V voltage provides power for the function key input circuit B4, the display circuit B5 and the MCU sub-control circuit B3.

Embodiment 1

The MCU main control circuit A3 acquires operating state information and mains power related information of the heating main loop A2 through the active/passive protection circuit A4, the heating main loop A2 and itself, and sends the operating state information and the mains power related information to the MCU sub-control circuit B3 through the main power carrier serial port circuit A5 and the auxiliary power carrier serial port circuit B1, and the MCU sub-control circuit B3 displays the operating state information and the mains power related information through the display circuit B5, where the operating state information and the mains power related information include actual timing information, actual operating gear information and fault information of the current electric blanket. The fault information includes a heating wire open circuit fault, a heating wire short circuit fault, a power voltage fault, a power frequency fault, a main control silicon controlled rectifier (SCR) short circuit fault and an MCU self-check fault, where the MCU self-test is implemented mainly by self-test on an internal random access memory (RAM) of an MCU, a read only memory (ROM), a special function register (SFR), an analog-to-digital converter (ADC), a clock, an interrupter and a universal asynchronous receiver/transmitter (UART).

Figure 2:
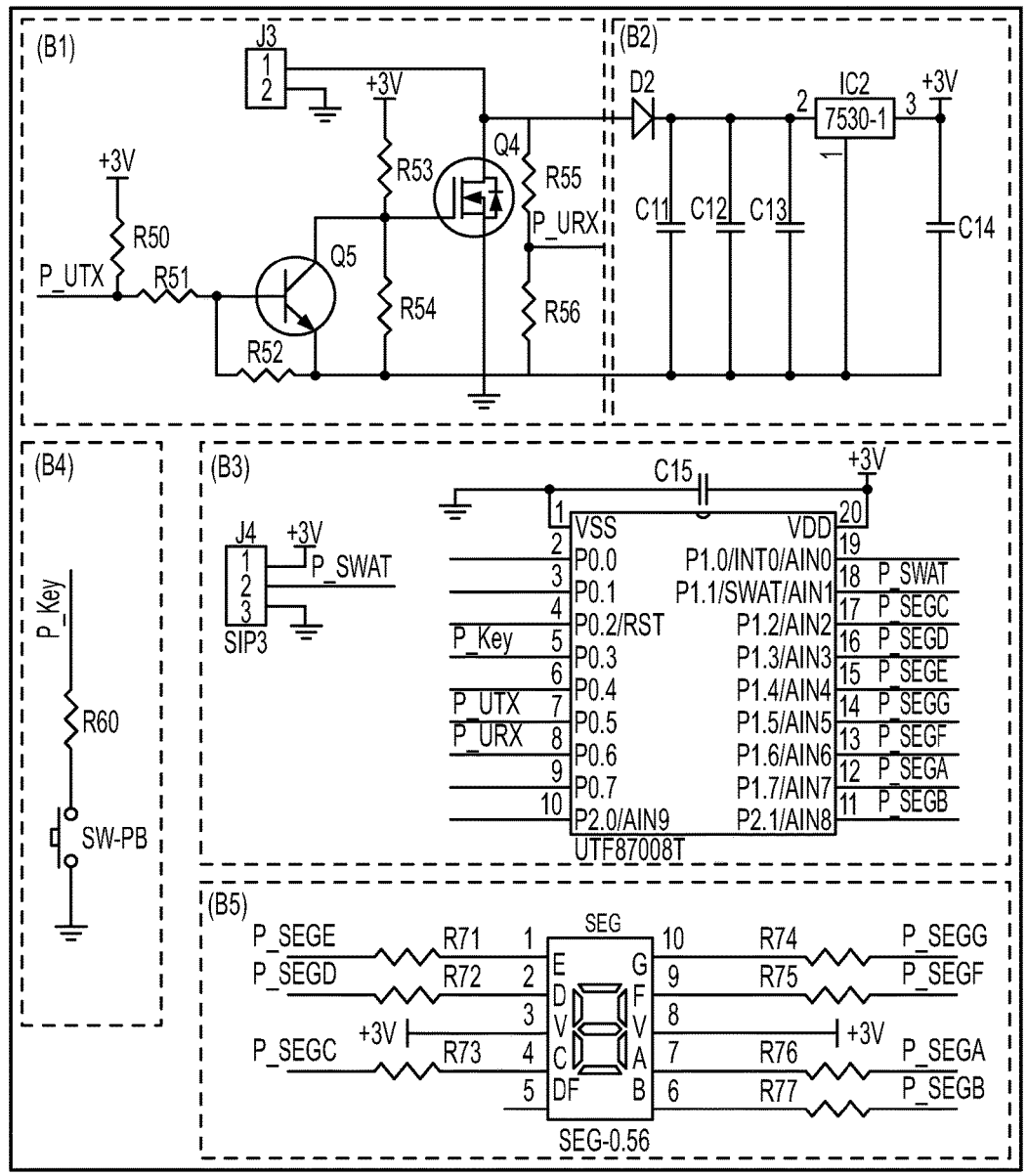
FIG. 2 is a schematic diagram of a first sub-control circuit according to an embodiment of the present disclosure.
Figure 4:
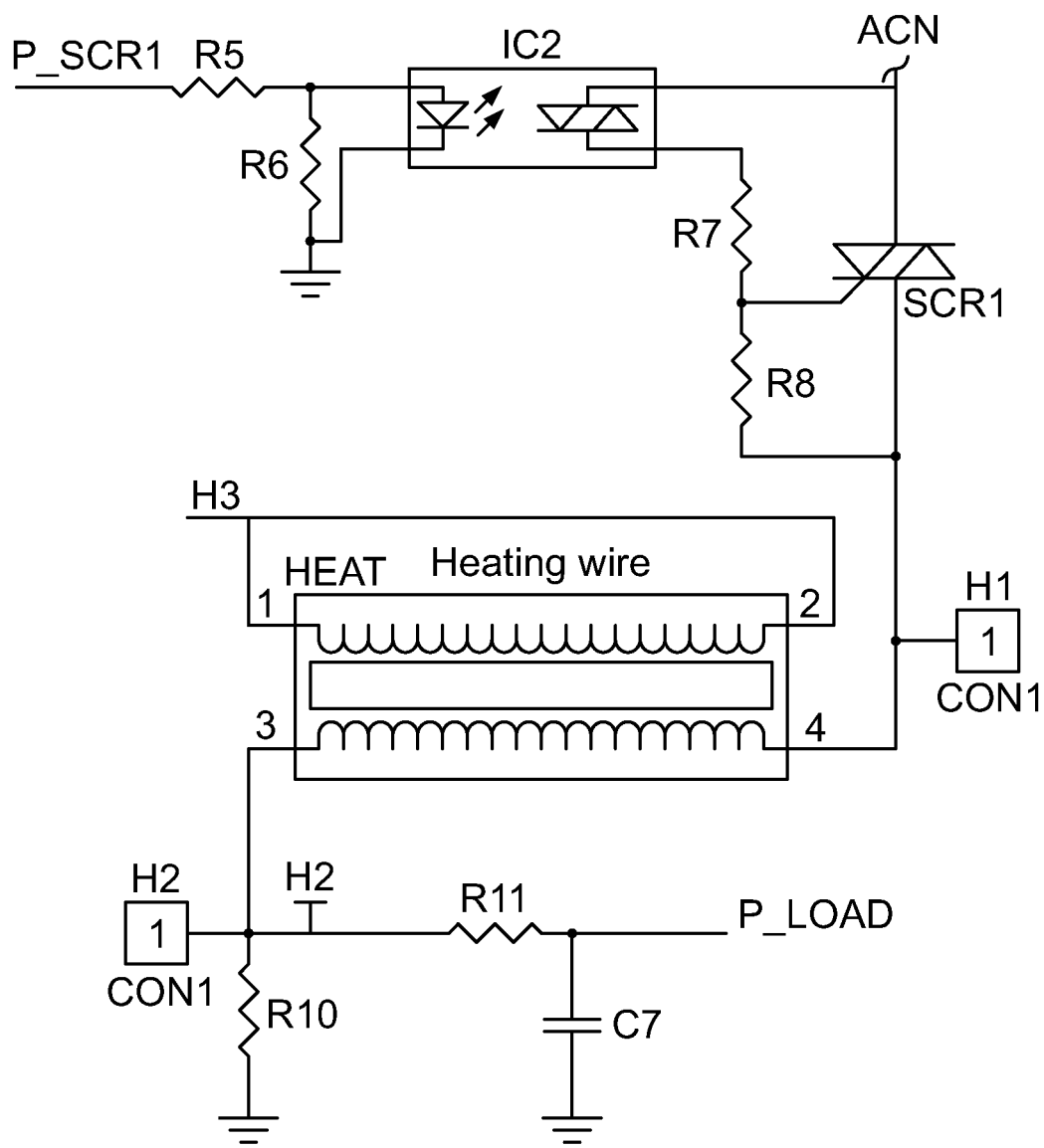
FIG. 4 is a circuit diagram of a heating main loop in FIG. 1 according to an embodiment of the present disclosure.
Figure 5:
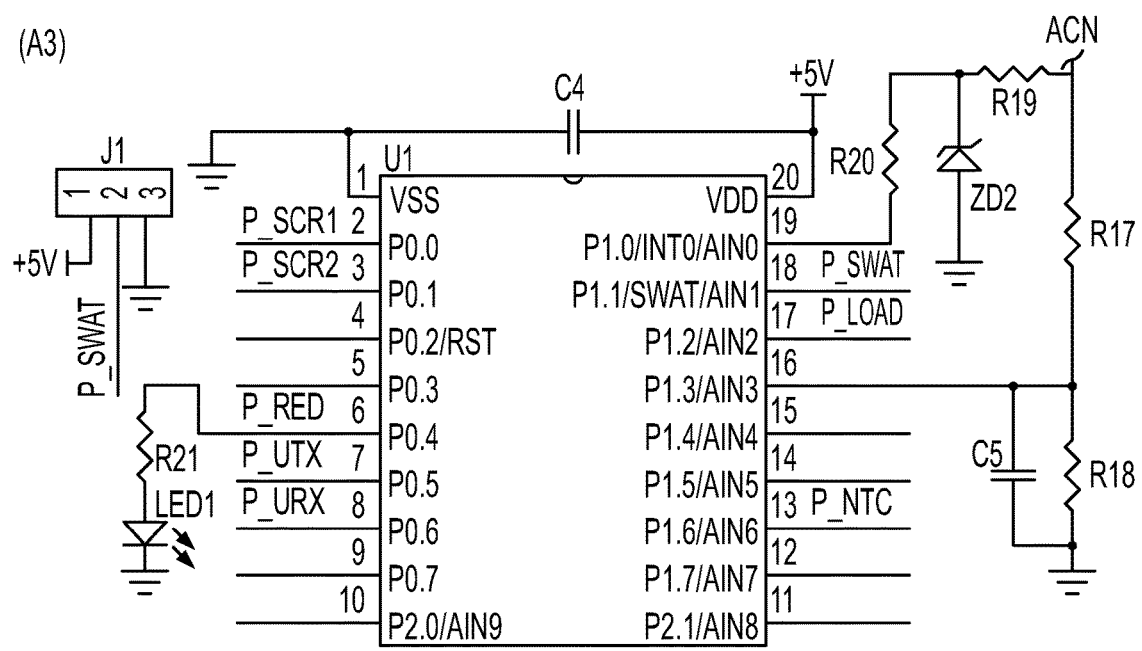
FIG. 5 is a first circuit diagram of an MCU main control circuit in FIG. 1 according to an embodiment of the present disclosure.
Figure 7:
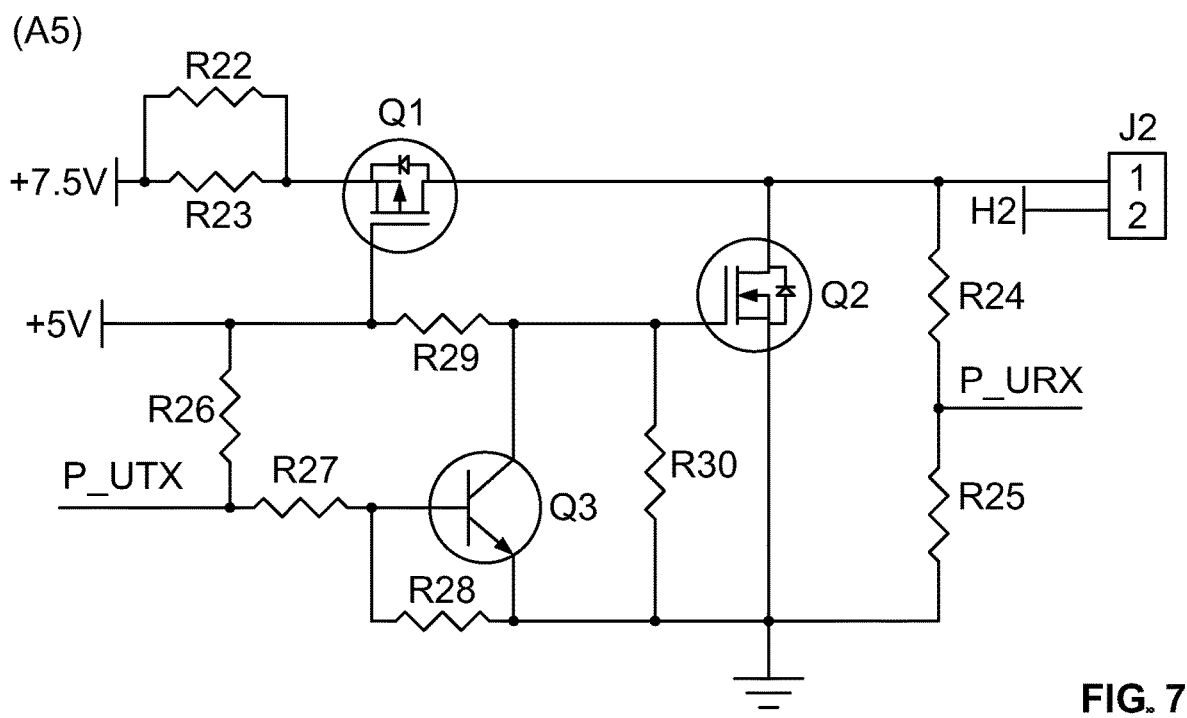
FIG. 7 is a first circuit diagram of a main power carrier serial port circuit in FIG. 1 according to an embodiment of the present disclosure.
Figure 8:
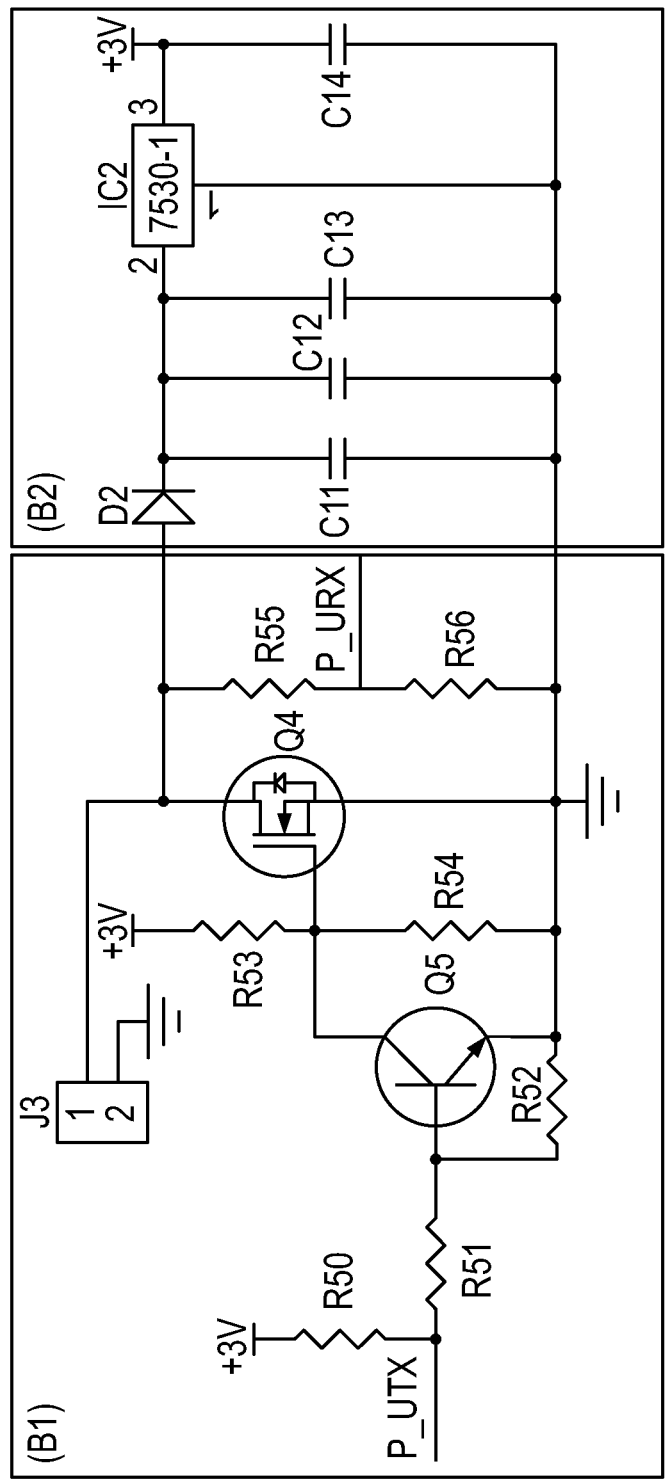
FIG. 8 is a first circuit diagram of an auxiliary power carrier serial port circuit and a sub-control power extraction circuit in FIG. 2 according to an embodiment of the present disclosure.
Figure 9:
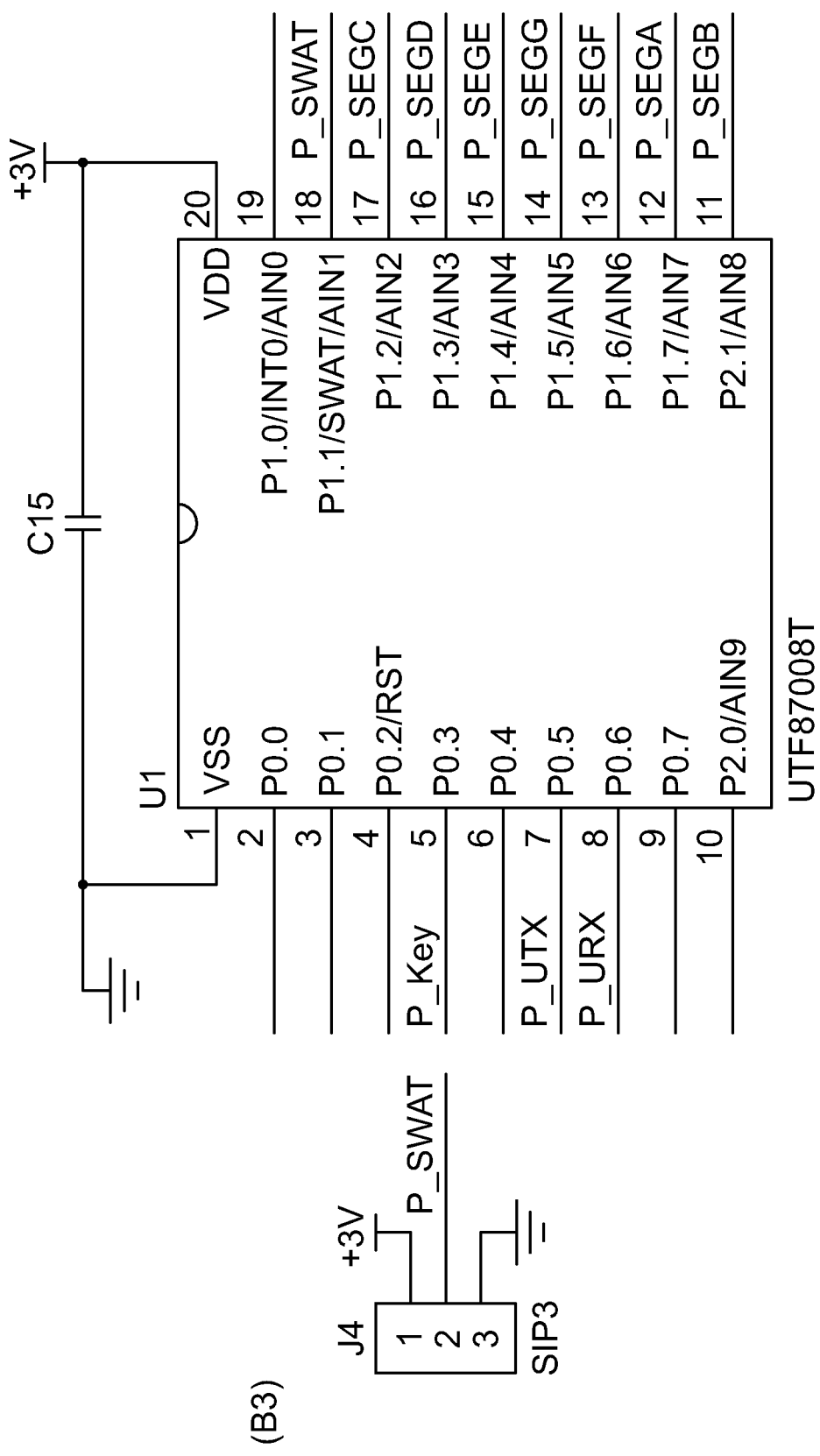
FIG. 9 is a first circuit diagram of an MCU sub-control circuit in FIG. 2 according to an embodiment of the present disclosure.
Figure 10:
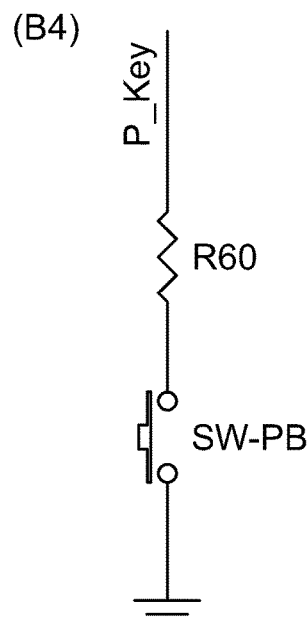
FIG. 10 is a circuit diagram of a function key input circuit in FIG. 2 according to an embodiment of the present disclosure.
Figure 11:
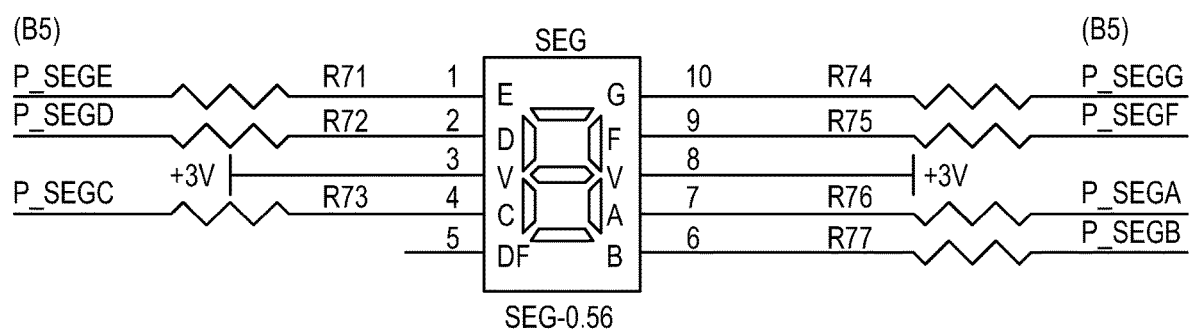
FIG. 11 is a first circuit diagram of a display circuit in FIG. 2 according to an embodiment of the present disclosure.

Three points H1, H2 and H3 in FIG. 2 and a first pin of J2 in FIG. 7 together form welding points of a connecting line of the electric blanket body, and the electric blanket body is provided with a heating wire. HEAT in FIG. 4 is the heating wire, and the heating wire is not in a main control board, but in the blanket body. The heating wire is connected to the main control board through H1, H2 and H3. A sub-control board is connected to two electronic wires, one of which is connected to H2 on the main control board, and the other is connected to the first pin of J2 in the main control board.

Figure 3:
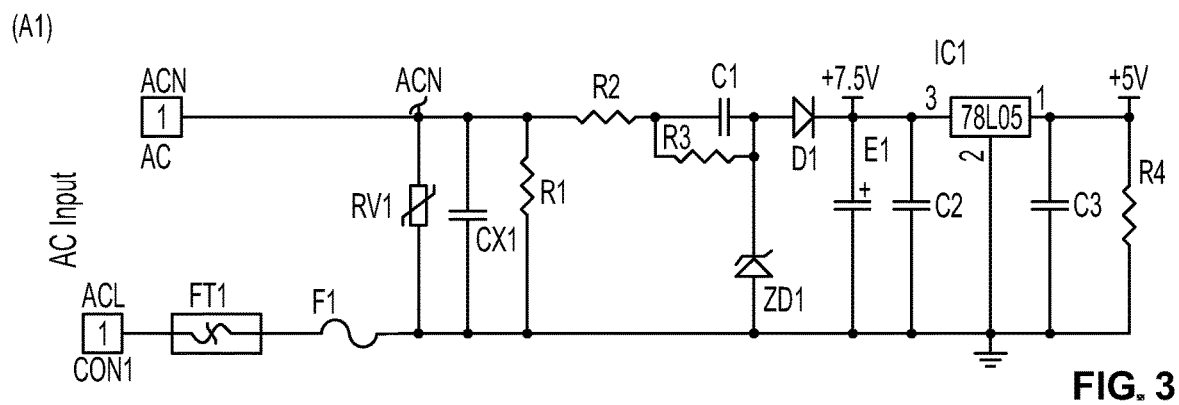
FIG. 3 is a circuit diagram of a relatively low voltage power conversion circuit in FIG. 1 according to an embodiment of the present disclosure.

FIG. 3 is a circuit diagram of the relatively low voltage power conversion circuit in the main control circuit. The relatively low voltage power conversion circuit A1 functions to provide relatively low voltage conversion for the main MCU and the sub-control, to finally obtain a DC 5 V power supply. The relatively low voltage power conversion circuit A1 is composed of a current fuse F1, a temperature fuse FT1, a varistor RV1, a safety capacitor CX1, a resistor R1, a resistor R2, a resistor R3, a capacitor C1, a rectifier diode D1, a voltage stabilizing diode ZD1, an electrolytic capacitor E1, a capacitor C2, a capacitor C3, a resistor R4 and a voltage stabilizing module IC1 which are connected through lines, all of which form a short-circuit protection circuit, an over-temperature failure protection circuit, an EMC anti-interference circuit, a resistance-capacitance step-down circuit and a 5 V linear voltage transformation circuit. It can be seen from FIG. 3 that a first end of the temperature fuse FT1 is connected to a live wire end ACL of an alternating current power supply, and a second end of the temperature fuse FT1 is connected to a first end of the current fuse F1; a second end of the current fuse F1, a second end of the varistor RV1, a second end of the safety capacitor CX1, a second end of the resistor R1, an anode of the voltage stabilizing diode ZD1, a cathode of the electrolytic capacitor E1, a second end of the capacitor C2, a second pin of the voltage stabilizing module IC1, a second end of the capacitor C3 and a second end of the resistor R4 are connected to a common terminal (GND). A first end of the varistor RV1, the first end of the capacitor CX1, a first end of the resistor R1 and a first end of the resistor R2 are connected to a null line end ACN of the alternating current power supply, a second end of the resistor R2 is connected to a first end of the resistor R3 and a first end of the capacitor C1; a second end of the resistor R3 and a second end of the capacitor C1 are connected with a cathode of the voltage stabilizing diode ZD1 and an anode of the rectifier diode D1; a cathode of the rectifier diode D1, an anode of the electrolytic capacitor E1 and a first end of the capacitor C2 and a third pin of the voltage stabilizing module IC1 are connected to output a +7.5 V voltage; and a first pin of the voltage stabilizing module IC1, a first end of the capacitor C3 and a first end of the resistor R4 are connected to output a stable +5 V voltage.

The short-circuit protection circuit includes a current fuse F1. When a short circuit occurs in a follow-up circuit, the current fuse F1 instantly fuses because the current exceeds its action current, and disconnects the follow-up circuit from a mains supply, thereby implementing the function of short-circuit protection.

The over-temperature failure protection circuit includes a fuse FT1 and a resistor R9. When the heating wire of the blanket body is at over-temperature for some reason (such as serious folding of products or winding of the heating wire) and the resistance of an NTC layer inside the heating wire decreases sharply, a high voltage drop is formed on the resistor R9, causing R9 to heat rapidly. When the heating temperature of R9 exceeds the action temperature of the temperature fuse FT1 close to R9, FT1 acts to disconnect the follow-up circuit from the mains power, thereby implementing the function of over-temperature failure protection.

The EMC anti-interference circuit includes a varistor RV1, a safety capacitor CX1 and a resistor R1.

The resistance-capacitance step-down circuit includes a resistor R2, a capacitor C1, a resistor R3, a voltage stabilizing diode ZD1 and a diode D1.

The 5 V linear voltage transformation circuit includes an electrolytic capacitor E1, a capacitor C2, a voltage stabilizing module IC1, a capacitor C3 and a resistor R4.

Figure 6:
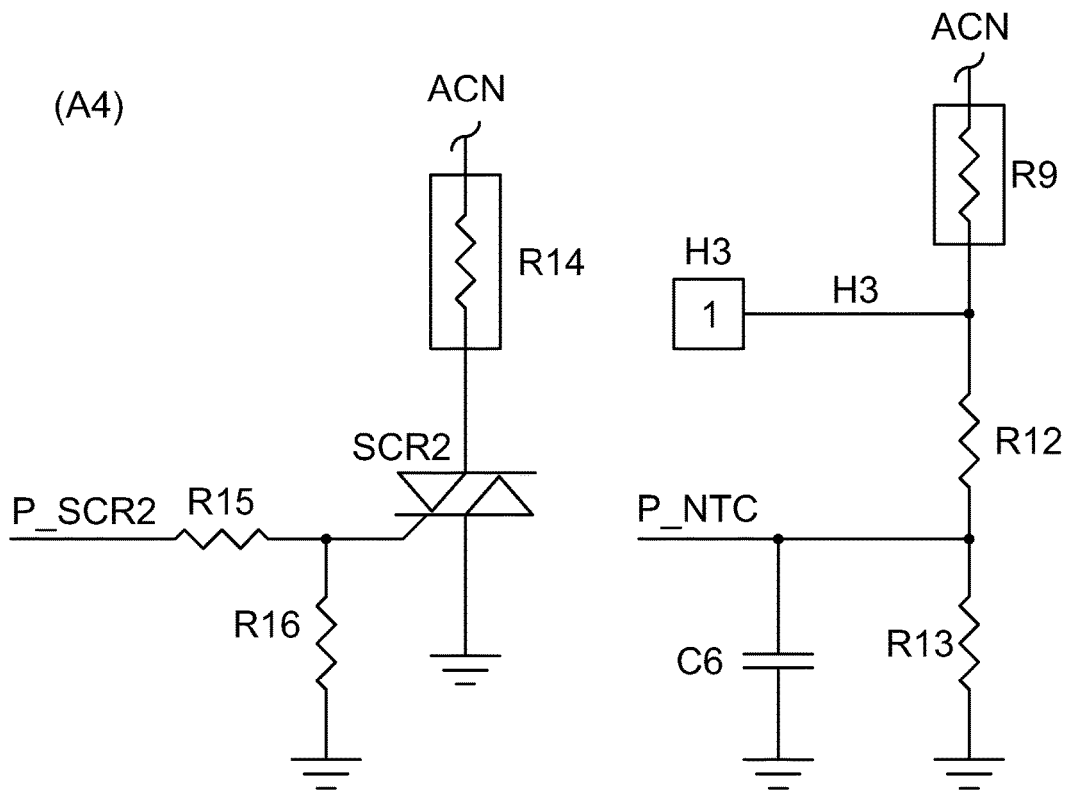
FIG. 6 is a circuit diagram of an active/passive protection circuit in FIG. 1 according to an embodiment of the present disclosure.

FIG. 4 is a schematic circuit diagram of a heating main loop according to the present disclosure. The heating main loop A2 is composed of a resistor R5, a resistor R6, an SCR optocoupler IC2, a resistor R7, a resistor R8, a main SCR1, a load current sampling resistor R10, a resistor R11, a capacitor C7 and a PTC/NTC heating wire of the electric blanket. FIG. 6 is a schematic circuit diagram of an active/passive protection circuit according to the present disclosure. The active/passive protection circuit A4 is composed of a resistor R14, an SCR2, a resistor R15, a resistor R16, a resistor R9, a resistor R12, a resistor R13 and a capacitor C6 which are connected through lines. A second end of the resistor R12, a first end of the resistor R13 and a first end of the capacitor C6 are connected with the 13th pin of the main MCU, and a first end of the resistor 15 is connected to the third pin of the main MCU. A working current of the PTC/NTC heating wire of the electric blanket forms a main loop through the series connection of the main SCR1 and the load current sampling resistor R10. The main MCU calculates, by detecting the working current passing through the load current sampling resistor R10, the current temperature of a blanket body through a certain program algorithm. The main MCU drives the SCR optocoupler IC2 through the resistor R5 to control the SCR1 to be turned on or off so as to control the PTC/NTC heating wire to operate or not to operate, thus achieving the purpose of controlling the heating temperature of the blanket body. In addition, an NTC signal detection circuit is composed of a heating wire detection layer, a resistor R9, a resistor R12 and a resistor R13.

FIG. 7 is a circuit diagram of a main power carrier serial port circuit in FIG. 1 according to the present disclosure. As shown in FIG. 7, the main power carrier serial port circuit A5 is composed of a resistor R22, a resistor R23, a tube Q1, a tube Q2, a communication port J2, a resistor R24, a resistor R25, a resistor R26, a resistor R27, a resistor R28, a resistor R29, a tube Q3 and a resistor R30 which are connected through lines.

The MCU main control circuit A3 according to the present disclosure includes the main MCU. The main MCU has 20 pins, and is responsible for acquiring power voltage, load current, power frequency and fault information, controlling the opening or closing of each output point according to an established program algorithm, receiving and processing control information sent by the sub-control, and sending operating status information of the heating product to the sub-control, thereby implementing the function of product control. The first pin of the main MCU is grounded, the 20th pin of the main MCU is connected to a +5 V output end of the relatively low voltage power conversion circuit, a capacitor C4 is arranged between the first pin and the 20th pin, the 19th pin of the main MCU is connected to a first end of a resistor R20, a second end of the resistor R20 is connected to a first end of a resistor R19 and a cathode of a voltage stabilizing diode ZD2, and an anode of the voltage stabilizing diode ZD2 is connected to a common terminal GND; a second end of the resistor R19 and a second end of a resistor R17 are connected to an ACN end, a first end of the resistor R17 is connected to the 16th pin of main MCU, a first end of the capacitor C5 and a first end of a resistor R18, a second end of the capacitor C5 and a second end of the resistor R18 are connected to the common terminal GND, the 6th pin of the main MCU is connected to a first end of a resistor R21, a second end of the resistor R21 is connected to an anode of a light-emitting diode (LED) 1, and a cathode of the LED 1 is connected to the common terminal GND; a first end of a programming port J1 is connected to the +5 V output end, a second end of the programming port J1 is connected to the 18th pin of the main MCU, and a third end of the programming port J1 is connected to the common terminal GND.

The active/passive protection circuit according to the present disclosure functions to protect the circuit, specifically as follows:

Active protection: When the main SCR1 is short-circuited and not controlled by the main MCU, which may cause overall high-temperature safety problems of a heating product, the main MCU drives the SCR2 to turn on the resistor R14 to heat and blow the temperature fuse FT1, and disconnects a main power supply for protection.

Passive protection: When the heating product may cause internal and external layer leakage at one or more points of the heating wire for some reason, a high voltage drop occurs to the resistor R9. This heats and blows the temperature fuse FT1, and the main power supply is disconnected for protection.

The auxiliary power carrier serial port circuit B1 is composed of a communication port J3, a resistor R50, a resistor R51, a resistor R52, a resistor R53, a resistor R54, a field-effect transistor Q4, a transistor Q5, a resistor R55 and a resistor R56 which are connected through lines. The main control circuit and the sub-control circuit exchange, through the main power carrier serial port circuit A5 and the auxiliary power carrier serial port circuit B1, state information of the heating product acquired by the main control and control information acquired by the sub-control, and finally the main MCU and the auxiliary MCU cooperate to control the whole heating product to operate normally. The sub-control power extraction circuit B2 is composed of a diode D2, a capacitor C11, a capacitor C12, a capacitor C13, a voltage stabilizing module IC2 and a capacitor C14. The sub-control power extraction circuit B2 extracts power required by the sub-control from a main power carrier serial port of the main control circuit, and finally outputs a DC 3.0 V voltage to ensure that the sub-control operates normally.

The MCU sub-control circuit B3 according to the present disclosure includes an auxiliary MCU with 20 pins, a capacitor C15 and a programming port J4, the first pin of the auxiliary MCU and a first end of the capacitor C15 are connected to the common terminal GND, a second end of the capacitor C15 and the 20th pin of the auxiliary MCU are connected with a +3 V end of the sub-control power extraction circuit, a first pin of the programming port J4 is connected to the +3 V end of the sub-control power extraction circuit, a second pin of the programming port J4 is connected to the 18th pin of the auxiliary MCU, and a third pin of the programming port J4 is connected to the common terminal GND. The MCU sub-control circuit B3 is responsible for acquiring, through a button SW-PB, control information desired by the user and sending the information to the main control through an auxiliary power carrier serial port. Besides, the auxiliary power carrier serial port receives operating state information of the heating product sent by the main control, and displays the information through the display SEG.

The function key input circuit B4 according to the present disclosure is composed of the button SW-PB and a resistor R60 which are sequentially connected through lines, a second contact of the button SW-PB is connected to the common terminal GND, a first contact of the button SW-PB is connected to a second end of the resistor R60, and a first end of the resistor R60 is connected to the 5th pin of the auxiliary MCU. The user of the heating product can input the desired product control information through the button SW-PB. The button SW-PB can control the power supply to be switched on or off and adjust a heating gear.

The display circuit B5 according to the present disclosure is composed of resistors R71, R72, R73, R74, R75, R76 and R77 and a display SEG which are connected through lines; a first end of the resistor R71 is connected to the 15th pin of the auxiliary MCU; a second end of the resistor R71 is connected to a first pin of the display SEG; a first end of the resistor R72 is connected to the 16th pin of the auxiliary MCU, and a second end of the resistor R72 is connected to a second pin of the display SEG; a third pin of the display SEG is connected to a +3 V end of the sub-control power extraction circuit; a first end of the resistor R73 is connected to the 17th pin of the auxiliary MCU, and a second end of the resistor R72 is connected to a 4th pin of the display SEG; a 5th pin of the display SEG is idle; a first end of the resistor R74 is connected to a 10-th pin of the display SEG; a second end of the resistor R74 is connected to the 14th pin of the auxiliary MCU; a first end of the resistor R75 is connected to a 9th pin of the display SEG; a second end of the resistor R75 is connected to the 13th pin of the auxiliary MCU; an 8th pin of the display SEG is connected to the +3 V end of the sub-control power extraction circuit; a first end of the resistor R76 is connected to a 7th pin of the display SEG, a second end of the resistor R76 is connected to the 12th pin of the auxiliary MCU; a first end of the resistor R77 is connected to a 6th pin of the display SEG, and a second end of the resistor R77 is connected to the 11th of the auxiliary MCU. The display circuit B5 is used to display the current operating state of the heating product, including information such as a heating gear and a product failure.

The main control circuit of the control circuit according to the present disclosure is designed in a wall-inserted adapter type controller, and the sub-control circuit is designed in a silica gel key which is sewed on a heating blanket body. The wall-inserted adapter type controller is directly connected to the heating blanket body through a data line. This can reduce the weight of the conventional controller connected to the heating blanket body, thereby enhancing the convenience of the user's operation.

Embodiment 2

Figure 12:
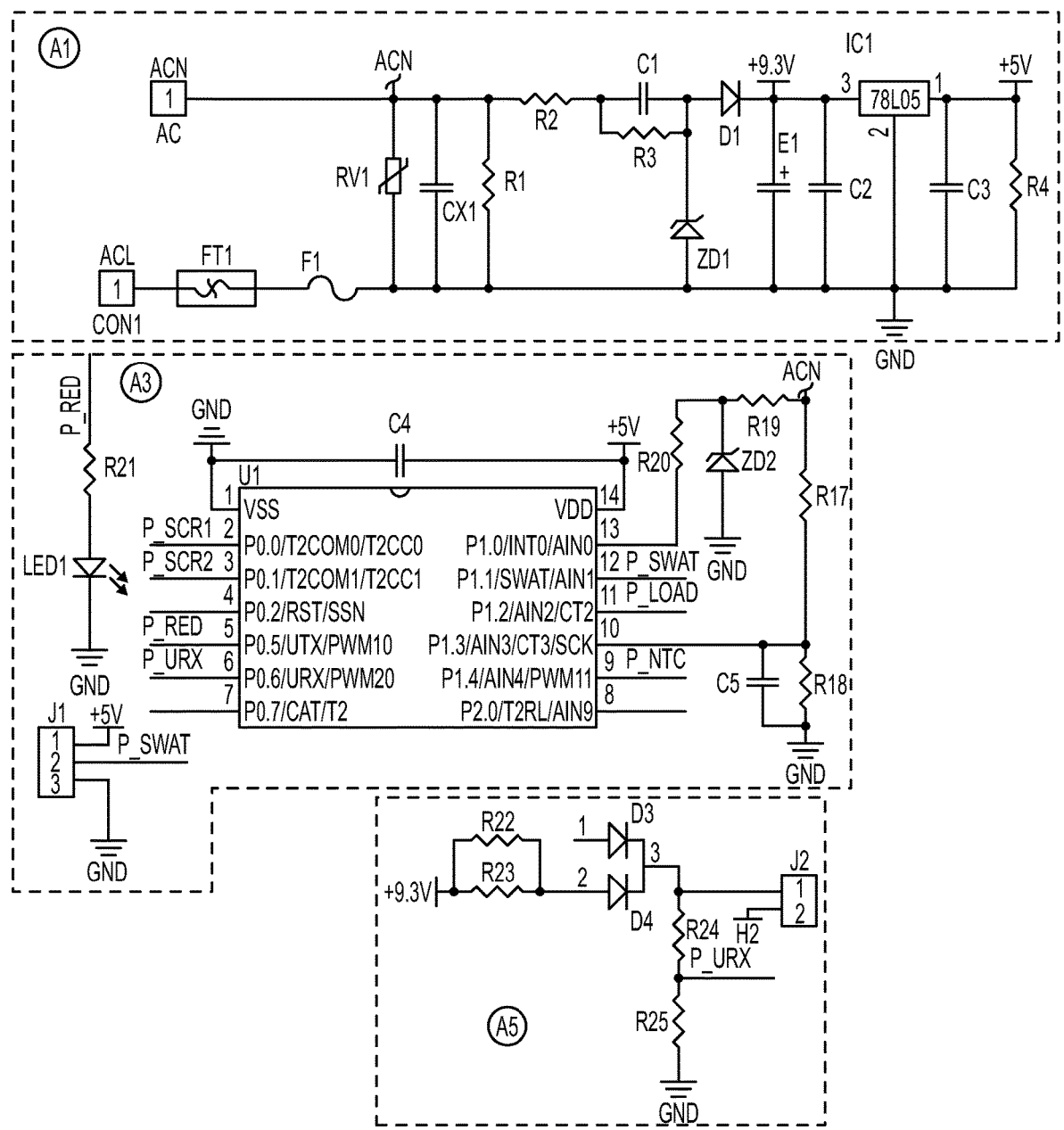
FIG. 12 is a schematic diagram of a second main control circuit according to an embodiment of the present disclosure.
Figure 12:
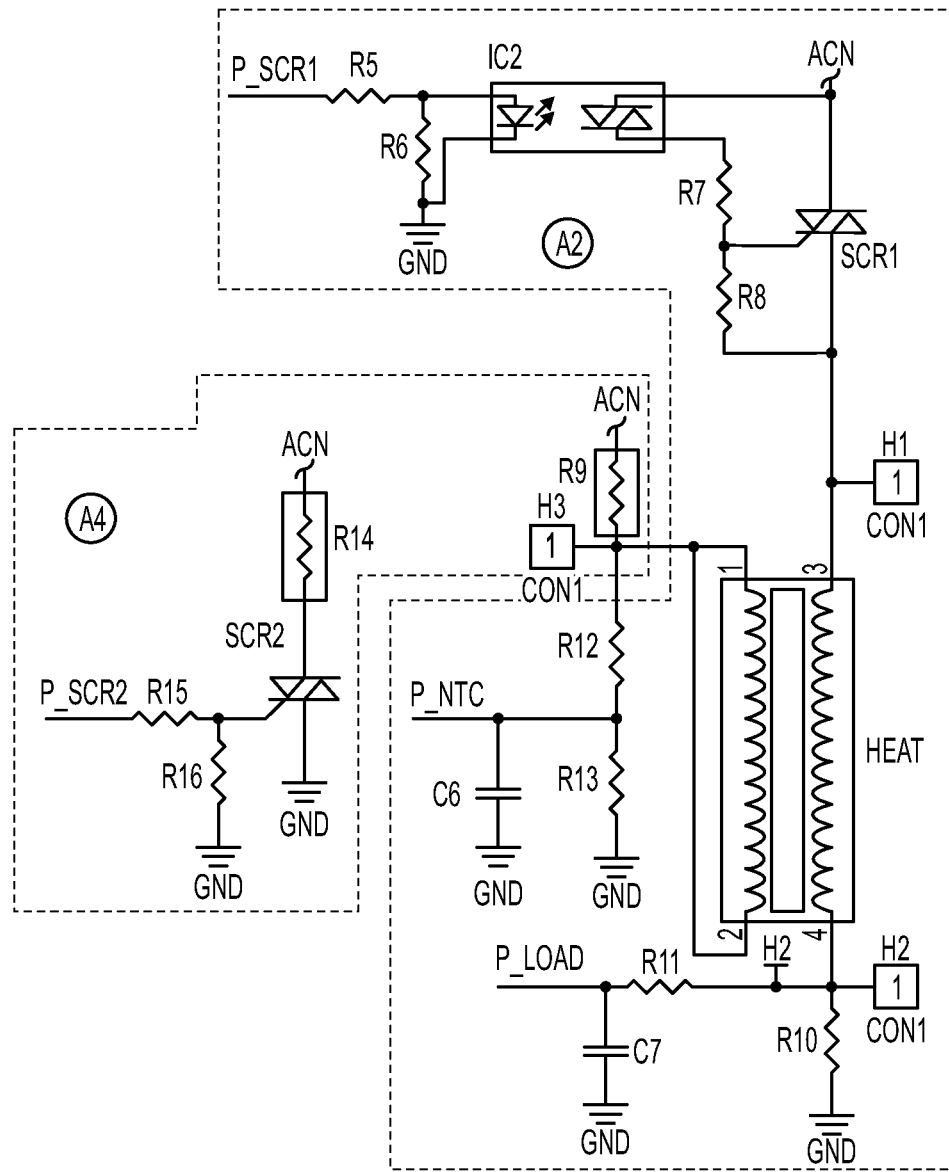
Figure 13:
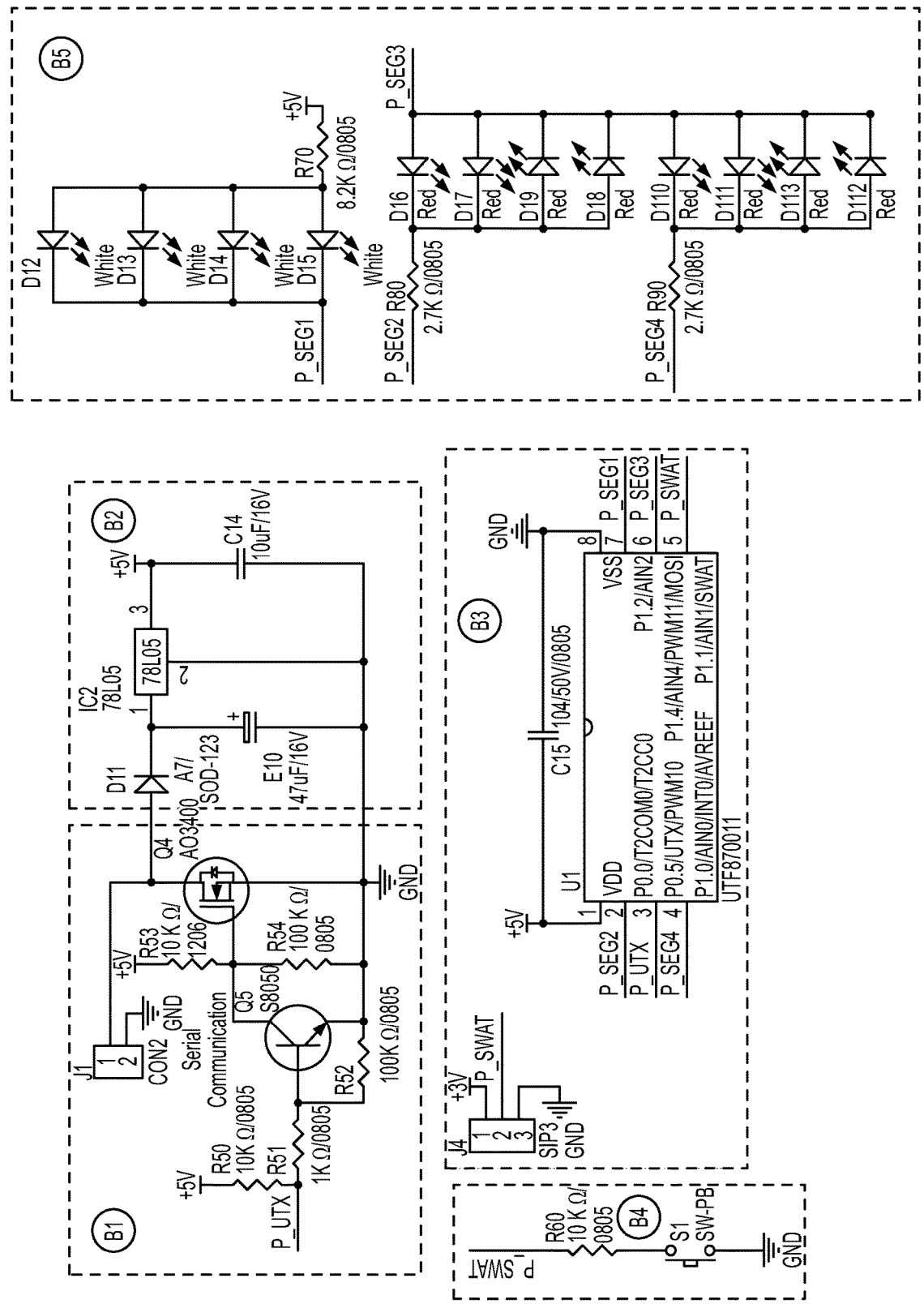
FIG. 13 is a schematic diagram of a second sub-control circuit according to an embodiment of the present disclosure.

FIG. 12 is a schematic diagram of a second main control circuit according to the present disclosure. FIG. 13 is a schematic diagram of a second sub-control circuit according to the present disclosure.

FIGS. 12 and 1 are schematic diagram of the main control circuit, where one difference is that in FIG. 12, an anode of an electrolytic capacitor E1 and a third pin of a voltage stabilizing module IC1 in a relatively low voltage power conversion circuit A1 are connected to output a +9.3 V voltage, while in FIG. 1, the anode of the electrolytic capacitor E1 and the third pin of the voltage stabilizing module IC1 in the relatively low voltage power conversion circuit A1 are connected to output a +7.5 V voltage.

The main control circuit and the sub-control circuit exchange operating state information and user control information through the main power carrier serial port circuit A5 and the auxiliary power carrier serial port circuit B1 to control the heating of the electric blanket in a mutually cooperative control mode, specifically including:

the function key input circuit B4 acquires heating gear information and transmits the heating gear information to the MCU sub-control circuit B3;

the MCU sub-control circuit B3 transmits the heating gear information to an MCU main control circuit A3 through an auxiliary power carrier serial port circuit B1 and a main power carrier serial port circuit A5;

the MCU main control circuit A3 controls the heating main loop A2 to heat according to the heating gear information; and the MCU main control circuit A3 detects heating information of the heating main loop A2 and adjusts a heating temperature of the heating main loop A2 according to the heating information and the heating gear information.

Figure 14:
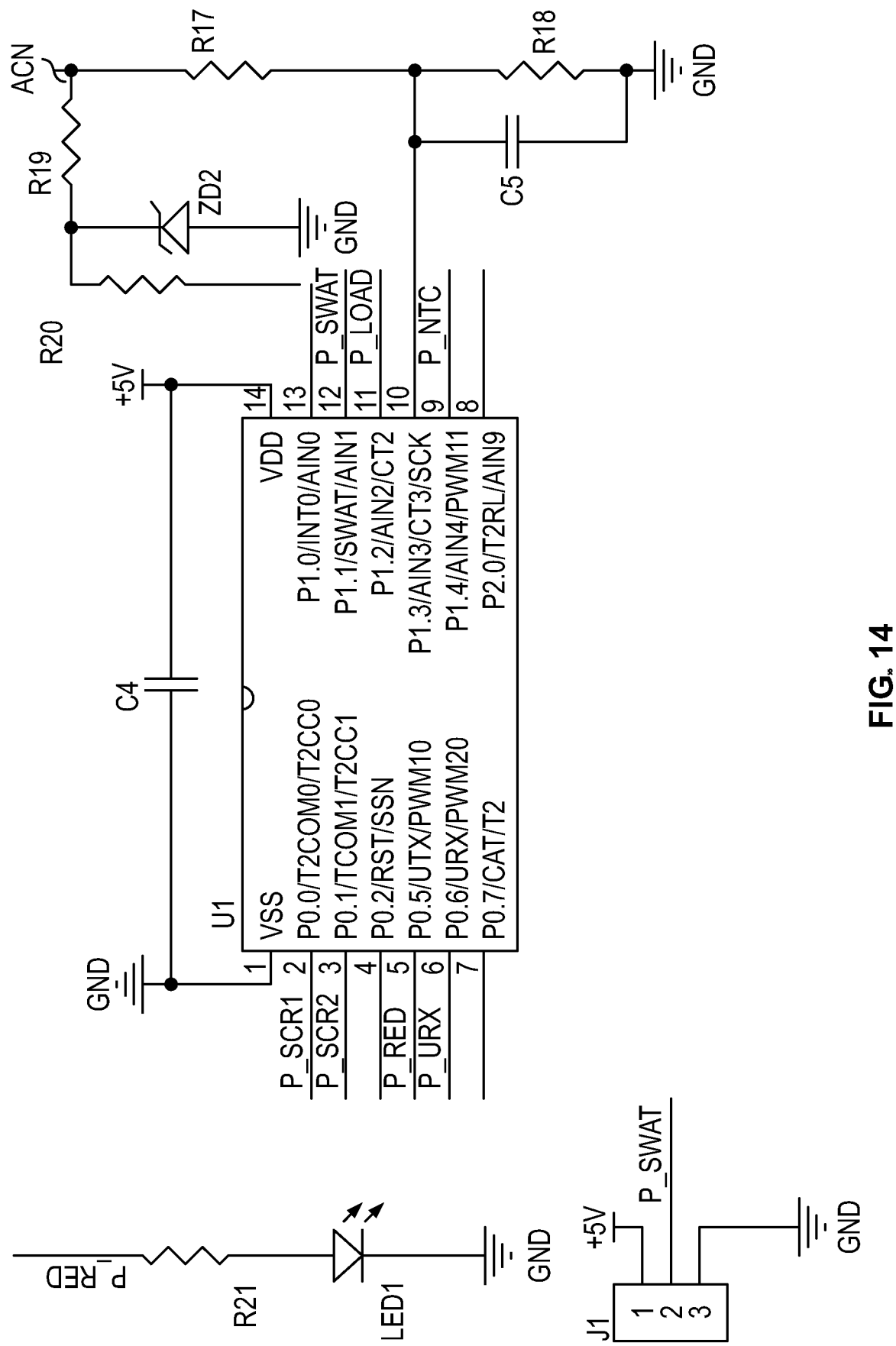
FIG. 14 is a second circuit diagram of an MCU main control circuit in FIG. 12 according to an embodiment of the present disclosure.

The MCU main control circuit A3 acquires operating state information and mains power related information of the heating main loop A2 through the active/passive protection circuit A4, the heating main loop A2 and itself. FIG. 14 is a second circuit diagram of the MCU main control circuit in FIG. 12. The MCU main control circuit includes a main MCU which has 14 pins and controls each output point to be turned on or off according to a predetermined program algorithm. The first pin of the main MCU is grounded, the 14th pin of the main MCU is connected to a +5 V output end of the relatively low voltage power conversion circuit, a capacitor C4 is arranged between the first pin and the 14th pin, the 13th pin of the main MCU is connected to a first end of a resistor R20, a second end of the resistor R20 is connected to a first end of a resistor R19 and a cathode of a voltage stabilizing diode ZD2, and an anode of the voltage stabilizing diode ZD2 is connected to a common terminal GND; a second end of the resistor R19 and a second end of a resistor R17 are connected to an ACN end, a first end of the resistor R17 is connected to the 10th pin of main MCU, a first end of the capacitor C5 and a first end of a resistor R18, a second end of the capacitor C5 and a second end of the resistor R18 are connected to the common terminal GND, the 5th pin of the main MCU is connected to a first end of a resistor R21, a second end of the resistor R21 is connected to an anode of a light-emitting diode (LED) 1, and a cathode of the LED 1 is connected to the common terminal GND; a first pin of a programming port J1 is connected to the +5 V output end, a second pin of the programming port J1 is connected to the 12th pin of the main MCU, and a third pin of the programming port J1 is connected to the common terminal GND.

Figure 15:
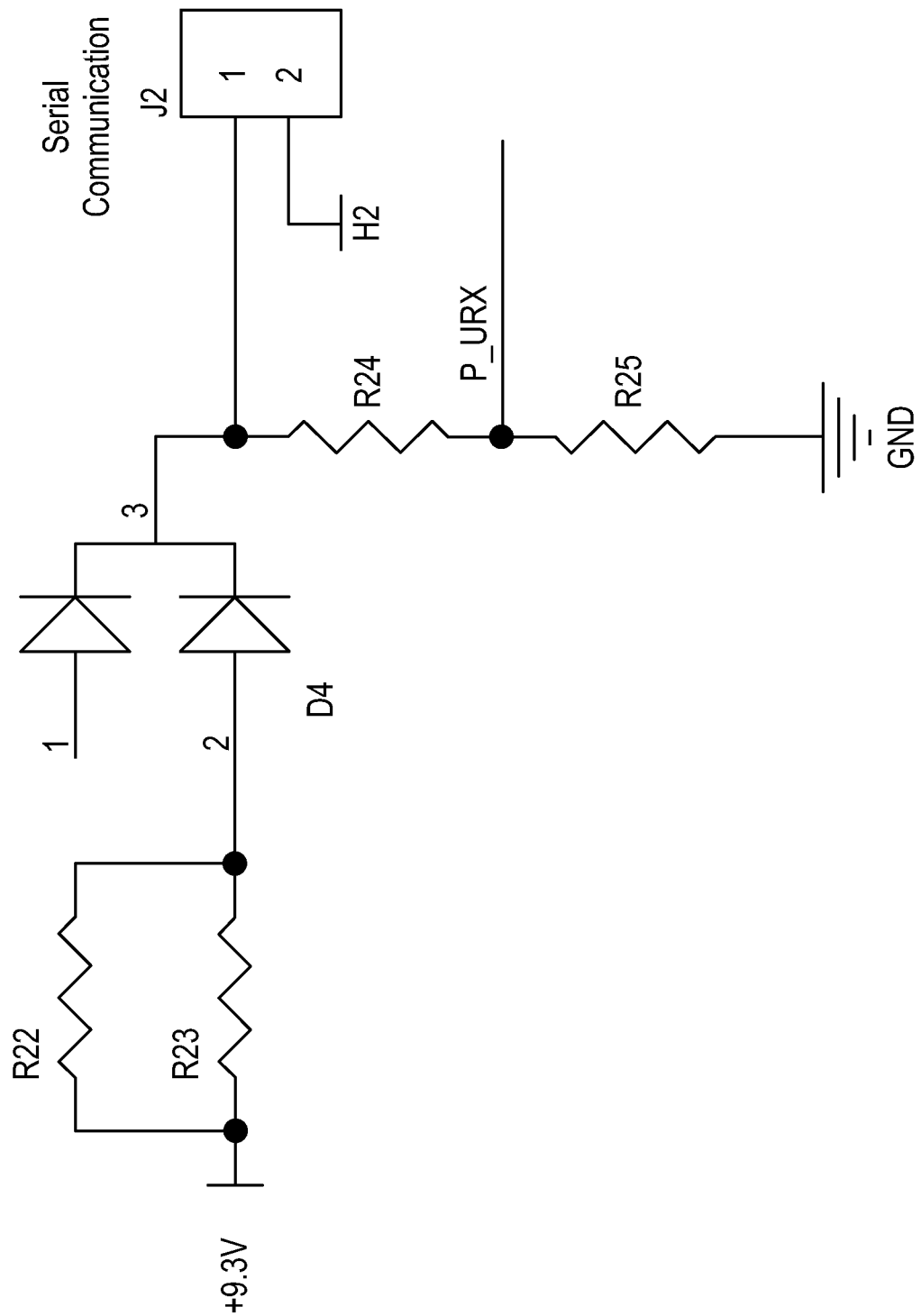
FIG. 15 is a second circuit diagram of a main power carrier serial port circuit in FIG. 12 according to an embodiment of the present disclosure.

FIG. 15 is a second circuit diagram of the main power carrier serial port circuit in FIG. 12 according to the disclosure. The main power carrier serial port circuit A5 includes a resistor R22, a resistor R23, a diode D3, a diode D4, a communication port J2, a resistor R24 and a resistor R25. A first end of the resistor R22 and a first end of the resistor R23 are connected to a first power supply, a second end of the resistor R22 and a second end of the resistor R23 are connected to an anode of the diode D4, a cathode of the diode D4 and a cathode of the diode D3 are connected to a first end of the resistor R24, the first end of the resistor R24 is further connected to a first pin of the communication port J2, a second end of the resistor R24 and a first end of the resistor R25 are connected to a 6th pin of a main MCU, a second end of the resistor R25 is connected to a common terminal GND, and a second pin of the communication port J2 is connected to a point H2 in the heating main loop A2.

Figure 17:
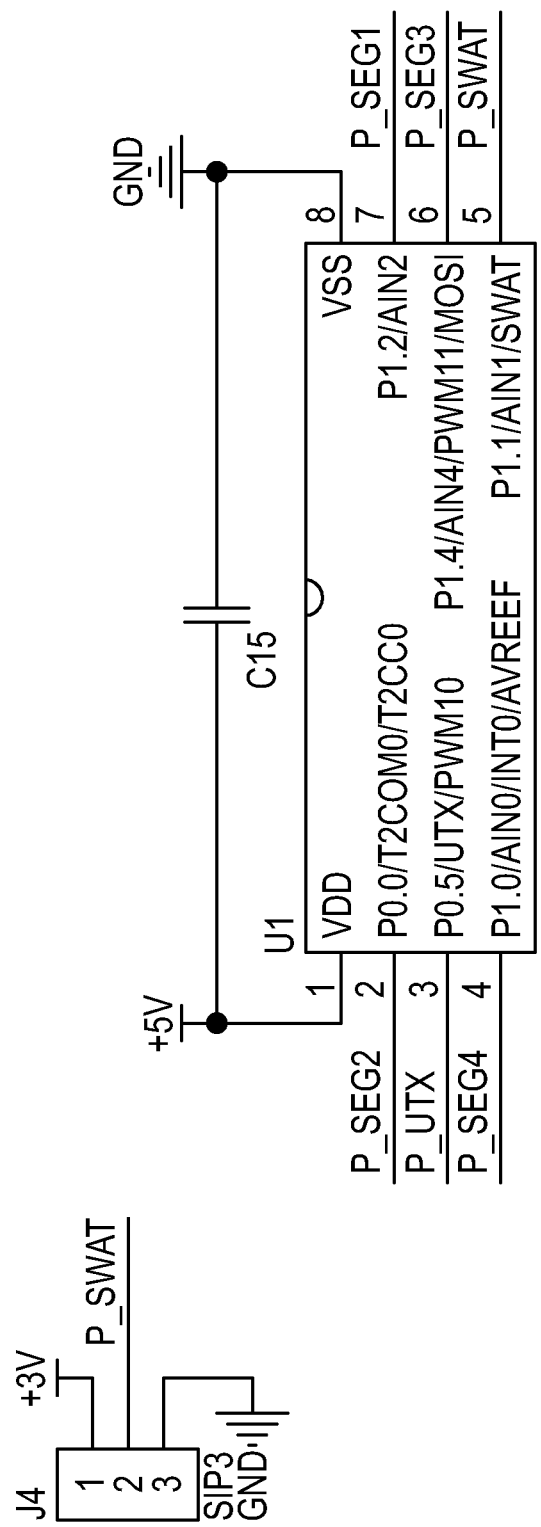
FIG. 17 is a second circuit diagram of an MCU subcontrol circuit in FIG. 13 according to an embodiment of the present disclosure.

FIG. 17 is a second circuit diagram of the MCU sub-control circuit in FIG. 13 according to the present disclosure. The MCU sub-control circuit B3 includes an auxiliary MCU with eight pins, a capacitor C15 and a programming port J4. The first pin of the auxiliary MCU is connected to a +5 V voltage and a first end of the capacitor C15, a second end of the capacitor C15 and the 8th of the auxiliary MCU are connected to a common terminal GND, a first pin of the programming port J4 is connected to the +5 V voltage, a second pin of the programming port J4 is connected to the 5th pin of the auxiliary MCU, and a third pin of the programming port J4 is connected to the common terminal GND.

Figure 16:
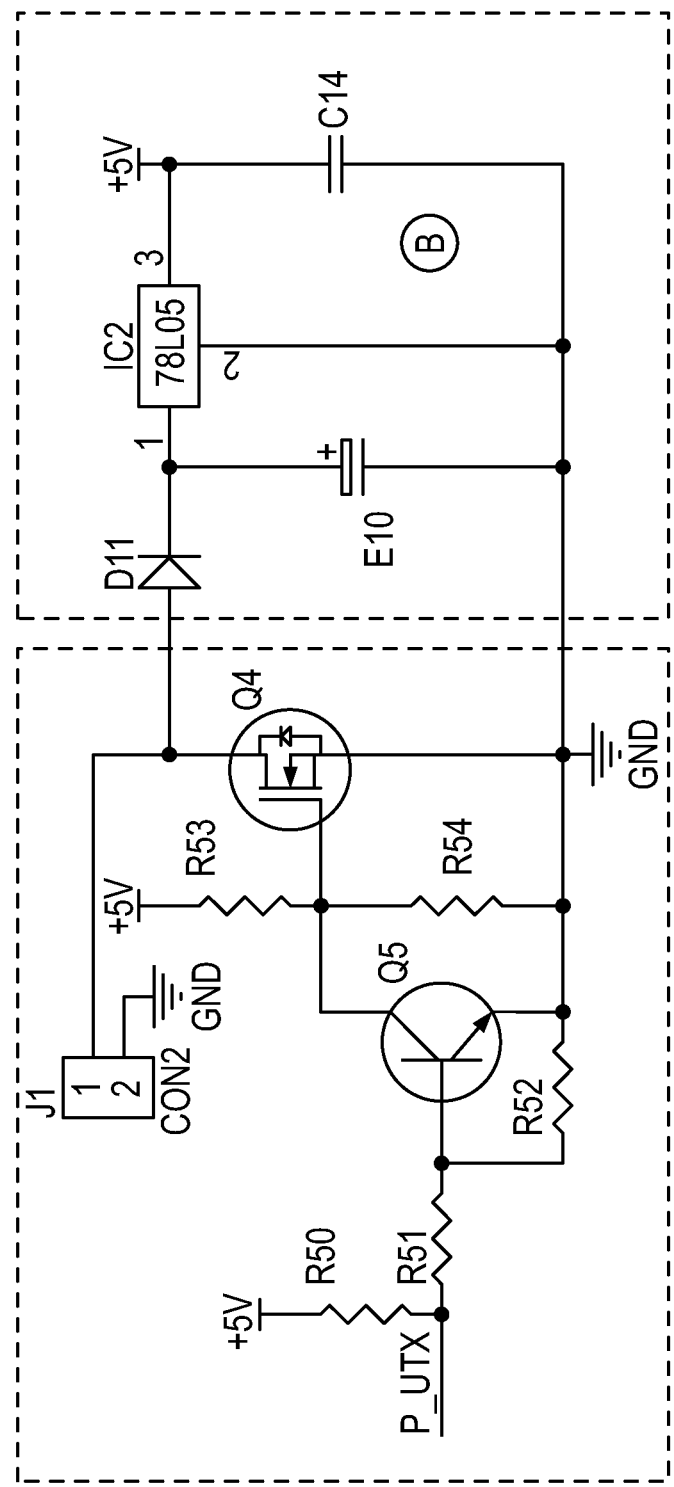
FIG. 16 is a second circuit diagram of an auxiliary power carrier serial port circuit and a sub-control power extraction circuit in FIG. 13 according to an embodiment of the present disclosure.

FIG. 16 is a second circuit diagram of the auxiliary power carrier serial port circuit and the sub-control power extraction circuit in FIG. 13 according to the present disclosure. The auxiliary power carrier serial port circuit B1 includes a communication port J3, a resistor R50, a resistor R51, a resistor R52, a resistor R53, a resistor R54, a field-effect transistor Q4 and a triode Q5. The sub-control power extraction circuit B2 includes a diode D11, an electrolytic capacitor E10, a voltage stabilizing module IC2 and a capacitor C14.

A first pin of the communication port J3 is connected to a drain of the field-effect transistor Q4, a source of the field-effect transistor Q4 is connected to a common terminal GND, a gate of the field-effect transistor Q4 is connected to a first end of the resistor R53, a first end of the resistor R54 and a collector of the triode Q5, a second end of the resistor R53 is connected to a +5 V voltage, a base of the triode Q5 is connected to a first end of the resistor R51 and a first end of the resistor R52, a second end of the resistor R51 is connected to a first end of the resistor R50 and a third pin of the auxiliary MCU, a second end of the resistor 54, a second end of the resistor R52 and an emitter of the triode Q5 are connected to the common terminal GND, a second end of the resistor R50 is connected to the +5 V voltage, and a second pin of the communication port J3 is connected to the common terminal GND.

The first pin of the communication port J3 is connected to an anode of the diode D11, a cathode of the diode D11 is connected to a first pin of the voltage stabilizing module IC2 and an anode of the electrolytic capacitor E10, a third pin of the voltage stabilizing module IC2 and a first end of the capacitor C14 are connected to the +5 V voltage, and a cathode of the electrolytic capacitor E10, a second pin of the voltage stabilizing module IC2 and a second end of the capacitor C14 are connected to the common terminal GND.

Figure 18:
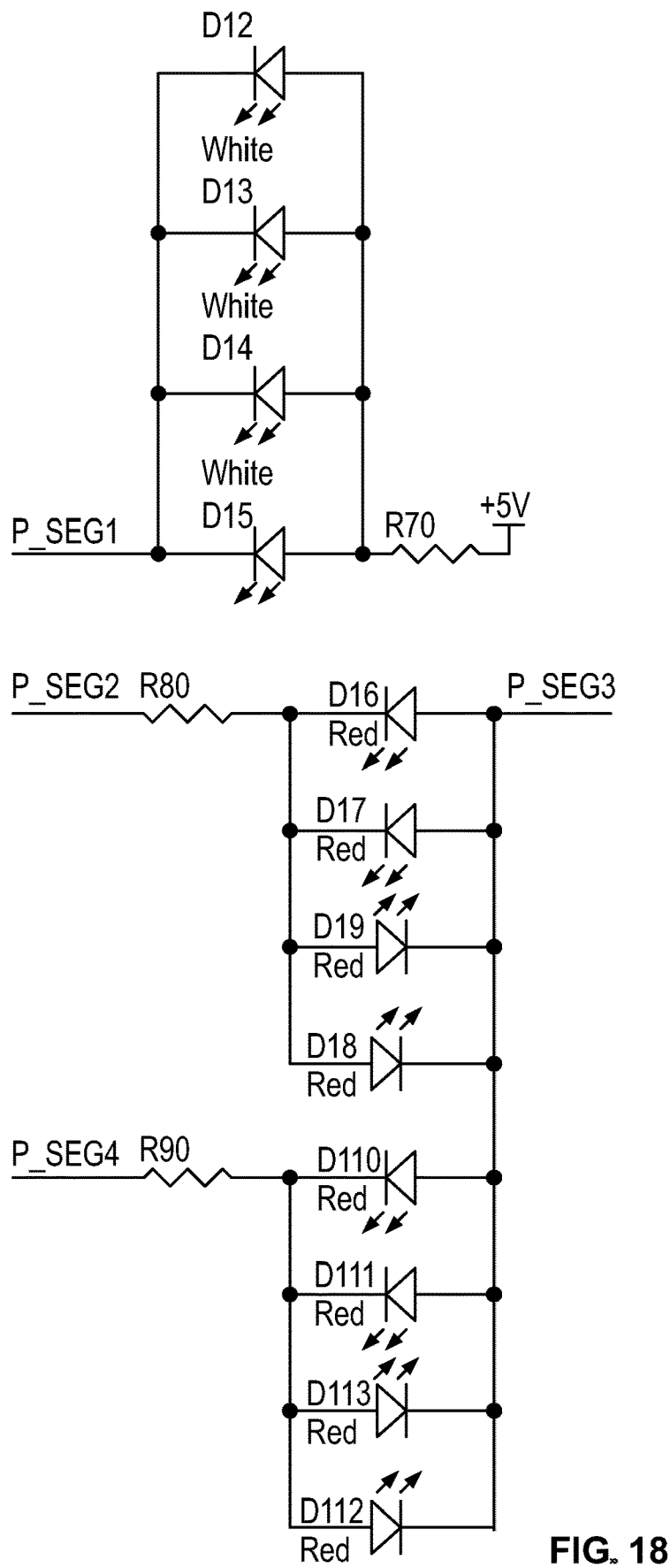
FIG. 18 is a second circuit diagram of a display circuit in FIG. 13 according to an embodiment of the present disclosure.

FIG. 18 is a second circuit diagram of the display circuit in FIG. 13 according to the present disclosure. The display circuit B5 includes LEDs D12, D13, D14, D15, D16, D17, D18, D19, D110, D111, D112 and D113, and further includes resistors R70, R80 and R90.

The LEDs D12, D13, D14 and D15 are connected in parallel to form a first LED parallel group, a cathode of the first LED parallel group is connected to a 7th pin of the auxiliary MCU, an anode of the first LED parallel group is connected to one end of the resistor R70, and the other end of the resistor R70 is connected to the +5 V voltage.

The LEDs D16, D17, D18 and D19 are connected in parallel to form a second LED parallel group, the LEDs D110, D111, D112 and D113 are connected in parallel to form a third LED parallel group. A cathode of the LED D16, a cathode of the LED D17, an anode of the LED D18 and an anode of the LED D19 in the second LED parallel group are connected to one end of the resistor R80, and the other end of the resistor R80 is connected to a second pin of the auxiliary MCU. An anode of the LED D16, an anode of the LED D17, a cathode of the LED D18 and a cathode of the LED D19 in the second LED parallel group are connected to an anode of the LED D110, an anode of the LED D111, a cathode of the LED D112 and a cathode of the LED D113 in the third LED parallel group and the 6th pin of the auxiliary MCU respectively. A cathode of the LED D110, a cathode of the LED D111, an anode of the LED D112 and an anode of the LED D113 in the third LED parallel group are connected to one end of the resistor R90, and the other end of the resistor R90 is connected to the 4th pin of the auxiliary MCU.

The LEDs in the first LED parallel group emit white light, and the LEDs in the second LED parallel group and the third LED parallel group emit red light.

In this embodiment, the sub-control circuit mainly displays information of current heating gears set by a user through buttons (there are four heating gears, namely, gear 1, gear 2, gear 3 and gear 4, which are set corresponding to 32° C., 36° C., 40° C. and 44° C. respectively), and transmits the information to the main control circuit through power carriers. The sub-control circuit also displays fault information of sub-control MCU self-test (the self-test mainly includes checking of peripherals of the MCU by the MCU itself, including an internal RAM, an ROM, a timer, an interrupter, an SFR, etc.). In this embodiment, the sub-control circuit does not receive actual heating state information and main control circuit fault information acquired by the main control (the main control circuit fault information includes: a heating wire open circuit fault, a heating wire short circuit fault, a main SCR short circuit fault, an MCU self-check fault, a power voltage fault, a power frequency fault, etc.). The information will be handled by the main control circuit itself, and will be indicated by flashing of an LED1 indicator lamp on the main control circuit after the main control circuit detects faults.

Each embodiment of the present specification is described in a progressive manner, each embodiment focuses on the difference from other embodiments, and the same and similar parts between the embodiments may refer to each other.

In this specification, specific examples are used for illustration of the principles and implementations of the present disclosure. The description of the foregoing embodiments is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A control circuit for an electric blanket, comprising a main control circuit composed of a relatively low voltage power conversion circuit (A1), a heating main loop (A2), a micro control unit (MCU) main control circuit (A3), an active/passive protection circuit (A4) and a main power carrier serial port circuit (A5), wherein the control circuit further comprises a sub-control circuit; the sub-control circuit is composed of an auxiliary power carrier serial port circuit (B1), a sub-control power extraction circuit (B2), an MCU sub-control circuit (B3), a function key input circuit (B4) and a display circuit (B5); and the main control circuit and the sub-control circuit exchange state information and control information through the main power carrier serial port circuit (A5) and the auxiliary power carrier serial port circuit (B1) to implement heating control of the electric blanket in a mutually cooperative control mode.

2. The control circuit for an electric blanket according to claim 1, wherein the MCU main control circuit (A3) comprises a main MCU which has 20 pins and controls each output point to be turned on or off according to a predetermined program algorithm, the first pin of the main MCU is connected to a common terminal (GND), the 20th pin of the main MCU is connected to a +5 V output end of the relatively low voltage power conversion circuit, a capacitor C4 is arranged between the first pin and the 20th pin, the 19th pin of the main MCU is connected to a first end of a resistor R20, a second end of the resistor R20 is connected to a first end of a resistor R19 and a cathode of a voltage stabilizing diode ZD2, and an anode of the voltage stabilizing diode ZD2 is connected to the common terminal (GND); a second end of the resistor R19 and a second end of a resistor R17 are connected to an ACN end, a first end of the resistor R17 is connected to the 16th pin of main MCU, a first end of the capacitor C5 and a first end of a resistor R18, a second end of the capacitor C5 and a second end of the resistor R18 are connected to the common terminal (GND), the 6th pin of the main MCU is connected to a first end of a resistor R21, a second end of the resistor R21 is connected to an anode of a light-emitting diode (LED) 1, and a cathode of the LED 1 is connected to the common terminal (GND); a first end of a programming port J1 is connected to the +5 V output end, a second end of the programming port J1 is connected to the 18th pin of the main MCU, and a third end of the programming port J1 is connected to the common terminal (GND).

3. The control circuit for an electric blanket according to claim 2, wherein the relatively low voltage power conversion circuit (A1) comprises a short-circuit protection circuit, an over-temperature failure protection circuit, an EMC anti-interference circuit, a resistance-capacitance step-down circuit and a 5 V linear voltage transformation circuit which are composed of an element F1, a fuse FT1, a varistor RV1, a capacitor CX1, a resistor R1, a resistor R2, a resistor R3, a capacitor C1, a rectifier diode D1, a voltage stabilizing diode ZD1, an electrolytic capacitor E1, a capacitor C2, a capacitor C3, a resistor R4 and a voltage stabilizing module IC1; a first end of the fuse FT1 is connected to a live wire end ACL of an alternating current power supply, and a second end of the fuse FT1 is connected to a first end of the element F1; a second end of the element F1, a second end of the varistor RV1, a second end of the capacitor CX1, a second end of the resistor R1, an anode of the voltage stabilizing diode ZD1, a cathode of the electrolytic capacitor E1, a second end of the capacitor C2, a second pin of the voltage stabilizing module IC1, a second end of the capacitor C3 and a second end of the resistor R4 are connected to the common terminal (GND); a first end of the varistor RV1, the first end of the capacitor CX1, a first end of the resistor R1 and a first end of the resistor R2 are connected to a null line end ACN of the alternating current power supply, a second end of the resistor R2 is connected to a first end of the resistor R3 and a first end of the capacitor C1; a second end of the resistor R3 and a second end of the capacitor C1 are connected with a cathode of the voltage stabilizing diode ZD1 and an anode of the rectifier diode D1; a cathode of the rectifier diode D1, an anode of the electrolytic capacitor E1 and a first end of the capacitor C2 and a third pin of the voltage stabilizing module IC1 are connected to output a +7.5 V voltage; and a first pin of the voltage stabilizing module IC1, a first end of the capacitor C3 and a first end of the resistor R4 are connected to output a stable +5 V voltage.

4. The control circuit for an electric blanket according to claim 3, wherein the heating main loop (A2) is composed of a resistor R5, a resistor R6, an electronic element IC2, a resistor R7, a resistor R8, a main silicon controlled rectifier (SCR)1, a load current sampling resistor R10, a resistor R11, a capacitor C7 and a PTC/NTC heating wire of the electric blanket; the active/passive protection circuit (A4) is composed of a resistor R14, an SCR2, a resistor R15, a resistor R16, a resistor R9, a resistor R12, a resistor R13 and a capacitor C6 which are connected through lines; a second end of the resistor 12, a first end of the resistor 13 and a first end of the capacitor C6 are connected with the 13th pin of the main MCU, and a first end of the resistor 15 is connected to the third pin of the main MCU.

5. The control circuit for an electric blanket according to claim 4, wherein the main power carrier serial port circuit (A5) is composed of a resistor R22, a resistor R23, a tube Q1, a tube Q2, a communication port J2, a resistor R24, a resistor R25, a resistor R26, a resistor R27, a resistor R28, a resistor R29, a tube Q3 and a resistor R30 which are connected through lines.

6. The control circuit for an electric blanket according to claim 5, wherein the auxiliary power carrier serial port circuit (B1) is composed of a communication port J3, a resistor R50, a resistor R51, a resistor R52, a resistor R53, a resistor R54, a tube Q4, a tube Q5, a resistor R55 and a resistor R56 which are connected through lines; and the sub-control power extraction circuit (B2) is composed of a diode D2, a capacitor C11, a capacitor C12, a capacitor C13, a voltage stabilizing module IC2 and a capacitor C14.

7. The control circuit for an electric blanket according to claim 6, wherein the MCU sub-control circuit (B3) according to the present disclosure comprises an auxiliary MCU with 20 pins, a capacitor C15 and a programming port J4, the first pin of the auxiliary MCU and a first end of the capacitor C15 are connected to the common terminal (GND), a second end of the capacitor C15 and the 20th pin of the auxiliary MCU are connected with a +3 V end of the sub-control power extraction circuit, a first pin of the programming port J4 is connected to the +3 V end of the sub-control power extraction circuit, a second pin of the relay programming port J4 is connected to the 18th pin of the auxiliary MCU, and a third pin of the programming port J4 is connected to the common terminal (GND).

8. The control circuit for an electric blanket according to claim 7, wherein the function key input circuit (B4) is composed of a button SW-PB and a resistor R60 which are connected through lines, a second contact of the button SW-PB is connected to the common terminal (GND), a first contact of the button SW-PB is connected to a second end of the resistor R60, and a first end of the resistor R60 is connected to the 5th pin of the auxiliary MCU.

9. The control circuit for an electric blanket according to claim 8, wherein the display circuit (B5) is composed of resistors R71, R72, R73, R74, R75, R76 and R77 and a display SEG which are connected through lines; a first end of the resistor R71 is connected to the 15th pin of the auxiliary MCU; a second end of the resistor R71 is connected to a first pin of the display SEG; a first end of the resistor R72 is connected to the 16th pin of the auxiliary MCU, and a second end of the resistor R72 is connected to a second pin of the display SEG; a third pin of the display SEG is connected to a +3 V end of the sub-control power extraction circuit; a first end of the resistor R73 is connected to the 17th pin of the auxiliary MCU, and a second end of the resistor R72 is connected to a 4th pin of the display SEG; a 5th pin of the display SEG is idle; a first end of the resistor R74 is connected to a 10-th pin of the display SEG; a second end of the resistor R74 is connected to the 14th pin of the auxiliary MCU; a first end of the resistor R75 is connected to a 9th pin of the display SEG; a second end of the resistor R75 is connected to the 13th pin of the auxiliary MCU; an 8th pin of the display SEG is connected to the +3 V end of the sub-control power extraction circuit; a first end of the resistor R76 is connected to a 7th pin of the display SEG, a second end of the resistor R76 is connected to the 12th pin of the auxiliary MCU; a first end of the resistor R77 is connected to a 6th pin of the display SEG, and a second end of the resistor R77 is connected to the 11th of the auxiliary MCU.

10. The control circuit for an electric blanket according to claim 1, wherein the relatively low voltage power conversion circuit (A1) changes the alternating current into a +5 V voltage, and the +5 V voltage provides power for the heating main loop (A2), the active/passive protection circuit (A4), the main power carrier serial port circuit (A5) and the MCU main control circuit (A3); and the sub-control power extraction circuit (B2) acquires a +3 V voltage or +5 V voltage from the main control circuit through the auxiliary power carrier serial port circuit (B1); and the +3 V voltage or +5 V voltage provides power for the function key input circuit (B4), the display circuit (B5) and the MCU sub-control circuit (B3).

11. The control circuit for an electric blanket according to claim 10, wherein the main control circuit and the sub-control circuit exchange state information and control information through the main power carrier serial port circuit (A5) and the auxiliary power carrier serial port circuit (B1) to control the heating of the electric blanket in a mutually cooperative control mode, specifically comprising:

the function key input circuit (B4) acquires heating gear information and transmits the heating gear information to the MCU sub-control circuit (B3);

the MCU sub-control circuit (B3) sends the heating gear information to the MCU main control circuit (A3) through the auxiliary power carrier serial port circuit (B1) and the main power carrier serial port circuit (A5); and the MCU main control circuit (A3) controls the heating main loop (A2) to heat according to the heating gear information; and the MCU main control circuit (A3) detects heating information of the heating main loop (A2) and adjusts a heating temperature of the heating main loop (A2) according to the heating information and the heating gear information.

12. The control circuit for an electric blanket according to claim 11, wherein the MCU main control circuit (A3) comprises a main MCU which has 14 pins and controls each output point to be turned on or off according to a predetermined program algorithm, the first pin of the main MCU is grounded, the 14th pin of the main MCU is connected to a +5 V output end of the relatively low voltage power conversion circuit, a capacitor C4 is arranged between the first pin and the 14th pin, the 13th pin of the main MCU is connected to a first end of a resistor R20, a second end of the resistor R20 is connected to a first end of a resistor R19 and a cathode of a voltage stabilizing diode ZD2, and an anode of the voltage stabilizing diode ZD2 is connected to the common terminal (GND); a second end of the resistor R19 and a second end of a resistor R17 are connected to an ACN end, a first end of the resistor R17 is connected to the 10th pin of main MCU, a first end of the capacitor C5 and a first end of a resistor R18, a second end of the capacitor C5 and a second end of the resistor R18 are connected to the common terminal (GND), the 5th pin of the main MCU is connected to a first end of a resistor R21, a second end of the resistor R21 is connected to an anode of a light-emitting diode (LED) 1, and a cathode of the LED 1 is connected to the common terminal (GND); a first pin of a programming port J1 is connected to the +5 V output end, a second pin of the programming port J1 is connected to the 12th pin of the main MCU, and a third pin of the programming port J1 is connected to the common terminal (GND).

13. The control circuit for an electric blanket according to claim 11, wherein the main power carrier serial port circuit (A5) comprises a resistor R22, a resistor R23, a diode D3, a diode D4, a communication port J2, a resistor R24 and a resistor R25; a first end of the resistor R22 and a first end of the resistor R23 are connected to a first power supply, a second end of the resistor R22 and a second end of the resistor R23 are connected to an anode of the diode D4, a cathode of the diode D4 and a cathode of the diode D3 are connected to a first end of the resistor R24, the first end of the resistor R24 is further connected to a first pin of the communication port J2, a second end of the resistor R24 and a first end of the resistor R25 are connected to a 6th pin of a main MCU, a second end of the resistor R25 is connected to a common terminal (GND), and a second pin of the communication port J2 is connected to a point H2 in the heating main loop (A2).

14. The control circuit for an electric blanket according to claim 11, wherein the MCU sub-control circuit (B3) comprises an auxiliary MCU with 8 pins, a capacitor C15 and a programming port J4, the first pin of the auxiliary MCU is connected to a +5 V voltage and a first end of the capacitor C15, a second end of the capacitor C15 and the 8th pin of the auxiliary MCU are connected to the common terminal (GND), a first pin of the programming port J4 is connected to the +5 V voltage, a second pin of the programming port J4 is connected to the 5th pin of the auxiliary MCU, and a third pin of the programming port J4 is connected to the common terminal (GND).

15. The control circuit for an electric blanket according to claim 11, wherein the auxiliary power carrier serial port circuit (B1) comprises a communication port J3, a resistor R50, a resistor R51, a resistor R52, a resistor R53, a resistor R54, a field-effect transistor Q4 and a triode Q5; and the sub-control power extraction circuit (B2) comprises a diode D11, an electrolytic capacitor E10, a voltage stabilizing module IC2 and a capacitor C14;

a first pin of the communication port J3 is connected to a drain of the field-effect transistor Q4, a source of the field-effect transistor Q4 is connected to a common terminal (GND), a gate of the field-effect transistor Q4 is connected to a first end of the resistor R53, a first end of the resistor R54 and a collector of the triode Q5, a second end of the resistor R53 is connected to a +5 V voltage, a base of the triode Q5 is connected to a first end of the resistor R51 and a first end of the resistor R52, a second end of the resistor R51 is connected to a first end of the resistor R50 and a third pin of the auxiliary MCU, a second end of the resistor 54, a second end of the resistor R52 and an emitter of the triode Q5 are connected to the common terminal (GND), a second end of the resistor R50 is connected to the +5 V voltage, and a second pin of the communication port J3 is connected to the common terminal (GND);

the first pin of the communication port J3 is connected to an anode of the diode D11, a cathode of the diode D11 is connected to a first pin of the voltage stabilizing module IC2 and an anode of the electrolytic capacitor E10, a third pin of the voltage stabilizing module IC2 and a first end of the capacitor C14 are connected to the +5 V voltage, and a cathode of the electrolytic capacitor E10, a second pin of the voltage stabilizing module IC2 and a second end of the capacitor C14 are connected to the common terminal (GND).

16. The control circuit for an electric blanket according to claim 11, wherein the display circuit (B5) comprises LEDs D12, D13, D14, D15, D16, D17, D18, D19, D110, D111, D112 and D113 and resistors R70, R80 and R90;

the LEDs D12, D13, D14 and D15 are connected in parallel to form a first LED parallel group, a cathode of the first LED parallel group is connected to a 7th pin of the auxiliary MCU, an anode of the first LED parallel group is connected to one end of the resistor R70, and the other end of the resistor R70 is connected to the +5 V voltage; and the LEDs D16, D17, D18 and D19 are connected in parallel to form a second LED parallel group, the LEDs D110, D111, D112 and D113 are connected in parallel to form a third LED parallel group, a cathode of the LED D16, a cathode of the LED D17, an anode of the LED D18 and an anode of the LED D19 in the second LED parallel group are connected to one end of the resistor R80, and the other end of the resistor R80 is connected to a second pin of the auxiliary MCU; an anode of the LED D16, an anode of the LED D17, a cathode of the LED D18 and a cathode of the LED D19 in the second LED parallel group are connected to an anode of the LED D110, an anode of the LED D111, a cathode of the LED D112 and a cathode of the LED D113 in the third LED parallel group and the 6th pin of the auxiliary MCU respectively; a cathode of the LED D110, a cathode of the LED D111, an anode of the LED D112 and an anode of the LED D113 in the third LED parallel group are connected to one end of the resistor R90, and the other end of the resistor R90 is connected to the 4th pin of the auxiliary MCU.

17. The control circuit for an electric blanket according to claim 11, wherein the relatively low voltage power conversion circuit (A1) comprises a current fuse F1, a temperature fuse FT1, a varistor RV1, a safety capacitor CX1, a resistor R1, a resistor R2, a resistor R3, a capacitor C1, a rectifier diode D1, a voltage stabilizing diode ZD1, an electrolytic capacitor E1, a capacitor C2, a capacitor C3, a resistor R4 and a voltage stabilizing module IC1; a first end of the temperature fuse FT1 is connected to a live wire end ACL of an alternating current power supply, and a second end of the temperature fuse FT1 is connected to a first end of the current fuse F1; a second end of the current fuse F1, a second end of the varistor RV1, a second end of the safety capacitor CX1, a second end of the resistor R1, an anode of the voltage stabilizing diode ZD1, a cathode of the electrolytic capacitor E1, a second end of the capacitor C2, a second pin of the voltage stabilizing module IC1, a second end of the capacitor C3 and a second end of the resistor R4 are connected to the common terminal (GND); a first end of the varistor RV1, the second end of the safety capacitor CX1, a first end of the resistor R1 and a first end of the resistor R2 are connected to a null line end ACN of the alternating current power supply, a second end of the resistor R2 is connected to a first end of the resistor R3 and a first end of the capacitor C1; a second end of the resistor R3 and a second end of the capacitor C1 are connected with a cathode of the voltage stabilizing diode ZD1 and an anode of the rectifier diode D1; a cathode of the rectifier diode D1, an anode of the electrolytic capacitor E1 and a first end of the capacitor C2 and a third pin of the voltage stabilizing module IC1 are connected to output a +9.3 V voltage; and a first pin of the voltage stabilizing module IC1, a first end of the capacitor C3 and a first end of the resistor R4 are connected to output a stable +5 V voltage.

* * * * *